US009342947B2

(12) United States Patent
Guinn et al.

(10) Patent No.: US 9,342,947 B2
(45) Date of Patent: May 17, 2016

(54) NEWS TICKER AS GAME DISPLAY MECHANISM

(71) Applicant: WMS Gaming, Inc., Waukegan, IL (US)

(72) Inventors: Andrew C. Guinn, Chicago, IL (US); Richard B. Robbins, Glenview, IL (US); Jamie W. Vann, Chicago, IL (US)

(73) Assignee: BALLY GAMING, INC., Las Vegas, NV (US)

( * ) Notice: Subject to any disclaimer, the term of this patent is extended or adjusted under 35 U.S.C. 154(b) by 354 days.

(21) Appl. No.: 13/724,872

(22) Filed: Dec. 21, 2012

(65) Prior Publication Data

US 2013/0165206 A1 Jun. 27, 2013

Related U.S. Application Data

(60) Provisional application No. 61/579,901, filed on Dec. 23, 2011.

(51) Int. Cl.
*A63F 13/00* (2014.01)
*G07F 17/32* (2006.01)

(52) U.S. Cl.
CPC ..................................... *G07F 17/32* (2013.01)

(58) Field of Classification Search
CPC . G07F 17/32; G07F 17/3244; G07F 17/3272; G07F 17/3276
USPC ......................................... 463/16–20, 40–42
See application file for complete search history.

(56) References Cited

U.S. PATENT DOCUMENTS

| | | | | |
|---|---|---|---|---|
| 6,159,096 | A | 12/2000 | Yoseloff | |
| 8,277,312 | B2 | 10/2012 | Matthews et al. | |
| 8,292,739 | B2 | 10/2012 | Iverson et al. | |
| 2006/0247039 | A1 | 11/2006 | Lerner et al. | |
| 2008/0311979 | A1 * | 12/2008 | Walker et al. | 463/25 |
| 2009/0131141 | A1 | 5/2009 | Walker et al. | |
| 2010/0029363 | A1 * | 2/2010 | Hoffman et al. | 463/20 |
| 2011/0269548 | A1 * | 11/2011 | Barclay et al. | 463/42 |

* cited by examiner

*Primary Examiner* — Ronald Laneau
*Assistant Examiner* — Ross Williams
(74) *Attorney, Agent, or Firm* — DeLizio Law, PLLC

(57) ABSTRACT

Systems and methods provide a game of chance based using information stream items such as items in a news ticker. Information stream items are received for display in a series of information stream items such as a news ticker. Game symbols are assigned to the information stream items based on the output of a random number generator. In response to determining that the game symbols assigned to the series of information stream items form a winning combination of game symbols, an account may be credited with cash or points.

25 Claims, 13 Drawing Sheets

NEWS TICKER AS GAME DISPLAY MECHANISM

RELATED APPLICATIONS

This application claims the priority benefit of U.S. Provisional Application Ser. No. 61/579,901 filed Dec. 23, 2011.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2012, WMS Gaming, Inc.

FIELD

Embodiments of the inventive subject matter relate generally to games of chance, and more particularly to games of chance including symbols associated with a news ticker.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

BRIEF DESCRIPTION OF THE FIGURES

Embodiments of the invention are illustrated in the Figures of the accompanying drawings in which.

DESCRIPTION OF THE EMBODIMENTS

This description of the embodiments is divided into five sections. The first section provides an introduction to embodiments of the invention, while the second section describes example wagering game machine architectures. The third section describes example operations performed by some embodiments and the fourth section describes example wagering game machines in more detail. The fifth section presents some general comments.

Introduction

This section provides an introduction to some embodiments of the invention. In general, the embodiments provide a game of chance where items in a news feed or news ticker are randomly assigned symbols or tokens for a game of chance. As used herein, a game of chance is a game that provides an uncertain outcome predominately determined by chance. The outcome of the game of chance is reflected in the arrangement of symbols or tokens assigned to the news feed items.

Operating Environment

This section describes an example operating environment and presents structural aspects of some embodiments.

Figure 1:
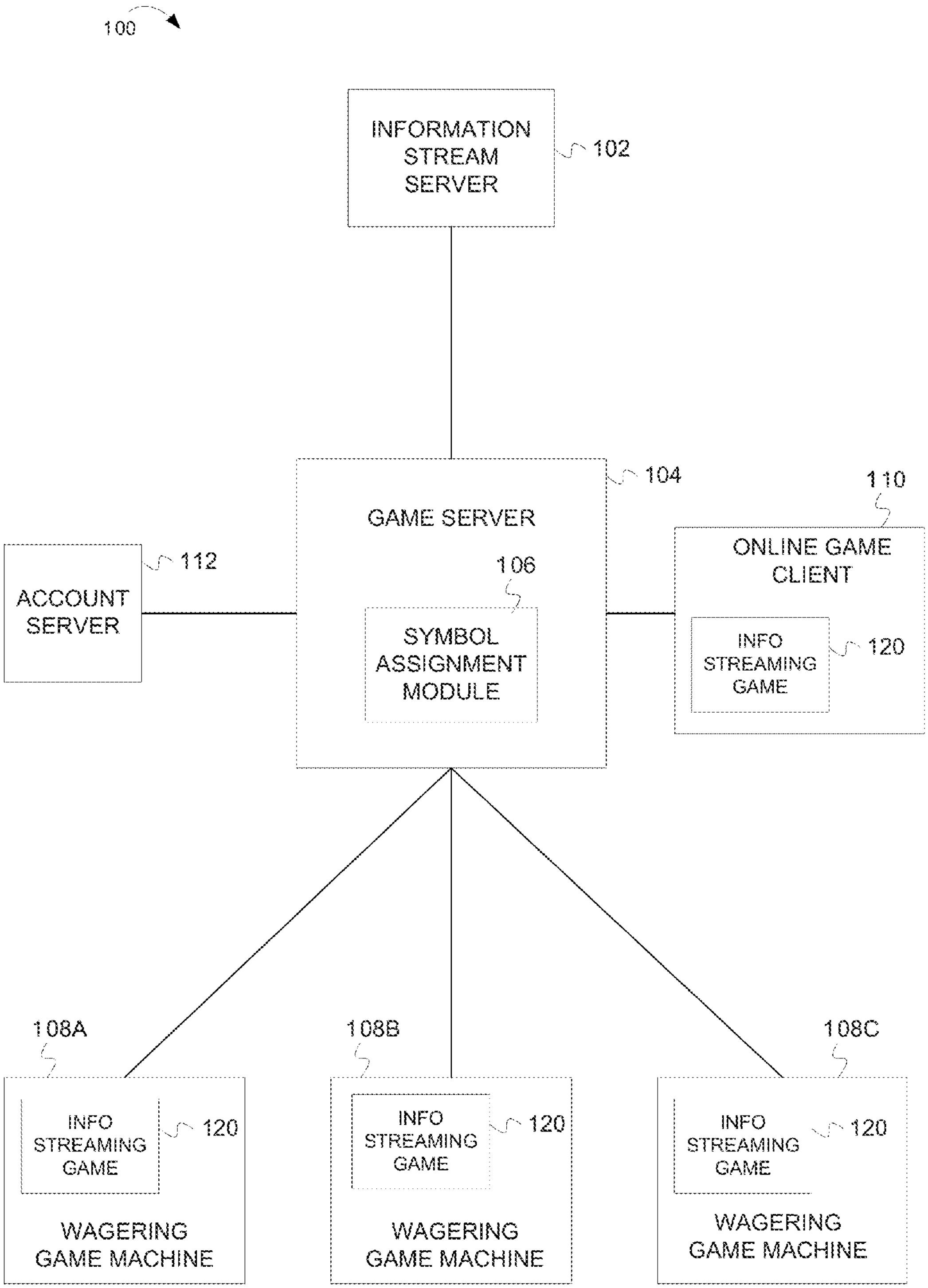
FIG. 1 is a block diagram of a system for assigning game symbols to information stream items according to embodiments.

FIG. 1 is a block diagram of a system 100 according to embodiments of the inventive subject matter. System 100, in some embodiments, includes an information stream server 102, and a game server 104. System 100 may optionally include one or more wagering game machines 108, online games 110 or an account server 112.

Information stream server 102 can be any server or service that provides an information stream. An example of an information stream is the Facebook news feed that allows users to post information that is then displayed as a news feed or news ticker to other users that are "friends" of the user that posted the information on Facebook. A similar function is provided on the LinkedIn that allows users to post information that is then displayed to other LinkedIn users that are linked to the posting user. A further example of an information stream is the "WinStream" feature of the Players Life web site (available at URL www.playerslife.com) provided by WMS Gaming Inc. The WinStream feature is a news feed that provides updates on winning activities of registered users on wagering game machines and online games. Still further examples of information streams are Twitter feeds and RSS (Really Simple Syndication) feeds. The inventive subject matter is not limited to any particular type of information stream.

The information stream may be displayed as a ticker, which scrolls information items on a display. The information items may scroll horizontally or vertically. As result of such scrolling, an information stream item will appear for a limited amount of time depending on the scroll rate and the size of the area of the display allocated to displaying information stream items.

Game server 104 provides one or more games that may be presented on either or both of wagering game machines 108 and online game client 110. When presented on wagering game machines 108, the game may be presented as an adjunct game displayed in addition to, or instead of, a main wagering game presented on the wagering game machine. Game server 104 includes a symbol assignment module 106 that receives information streams and assigns game symbols or tokens to individual postings within the information stream. In some embodiments, output of a random number generator is used, at least in part, to determine the assignment of a symbol to a posting. The posting may then be supplied to an information streaming game on wagering game machine 108 or online game client 110 for use as part of a game outcome for information streaming game 120.

Information streaming game 120 is a game of chance that utilizes symbols or tokens assigned by symbol assignment module 106 to items in an information stream. Information streaming game 120 may be based on a card game, dice game, slots game, sweepstakes game or other game of chance. The symbols or tokens assigned by symbol assignment module are appropriate to the type of game implemented by information streaming game 120. Further details on various games implemented by information streaming game 120 are provided below. Information streaming game 120 may be presented in conjunction with other games (e.g., a base wagering game or bonus game) or as a standalone game.

Wagering game machine 108 can be an electromechanical wagering game machine configured to play wagering games. A wagering game presented on wagering game machine 108 can be a mechanical slots game. Alternatively, a wagering game can be an electronic wagering game including video casino games, such as blackjack, slots, keno, poker, blackjack, roulette, etc.

Online game client 110 communicates with game server 104 to present games of chance on online game client 110. For example, online game client 110 may present information streaming game 120. Online game client 110 may be any type of computing device, including personal computers, laptop computers, tablet computers, personal digital assistants, mobile phones etc. The embodiments are not limited to any particular computing device.

Account server 112 maintains accounts for players that may use a wagering game machine 108. Various types of accounts may be maintained by account server 112. For example, account server 112 may maintain a cash balance account for used by players on wagering game machines 108. Alternatively, account server 112 may maintain loyalty points for a casino, airline, hotel, rental car, credit card or other loyalty reward system. Further, account server 112 may maintain a points-based account where players earn points by participating in activities on a web site. While in some embodiments information streaming game 120 is a casual game that is provided for entertainment purposes only, in alternative embodiments a player may wager points or cash as part of information streaming game 120.

Although shown as separate entities in FIG. 1, the functionality provided by information stream server 102, game server 104, wagering game machine 108, online game client 110 or account server 112 may be combined into fewer entities or subdivided into further entities. Additionally, the functionality may be provided within different entities than that shown in FIG. 1. As an example, an information stream server 102 may include a symbol assignment module 106 and provide a game directly to an online game client. Additionally, an information streaming game 120 may include a symbol assignment module 106. Further, a wagering game machine 108 may generate a value or symbol that is provided to symbols assignment 106. This value or symbol may be used by symbol assignment module 106 to provide game symbols for use by information streaming game 120.

Although FIG. 1 describes some embodiments, the following sections describe many other features and embodiments.

Example Operations

This section describes operations associated with some embodiments of the invention. In the discussion below, the flow diagrams will be described with reference to the block diagrams presented above. However, in some embodiments, the operations can be performed by logic not described in the block diagrams.

In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform less than all the operations shown in any flow diagram.

Figure 5:
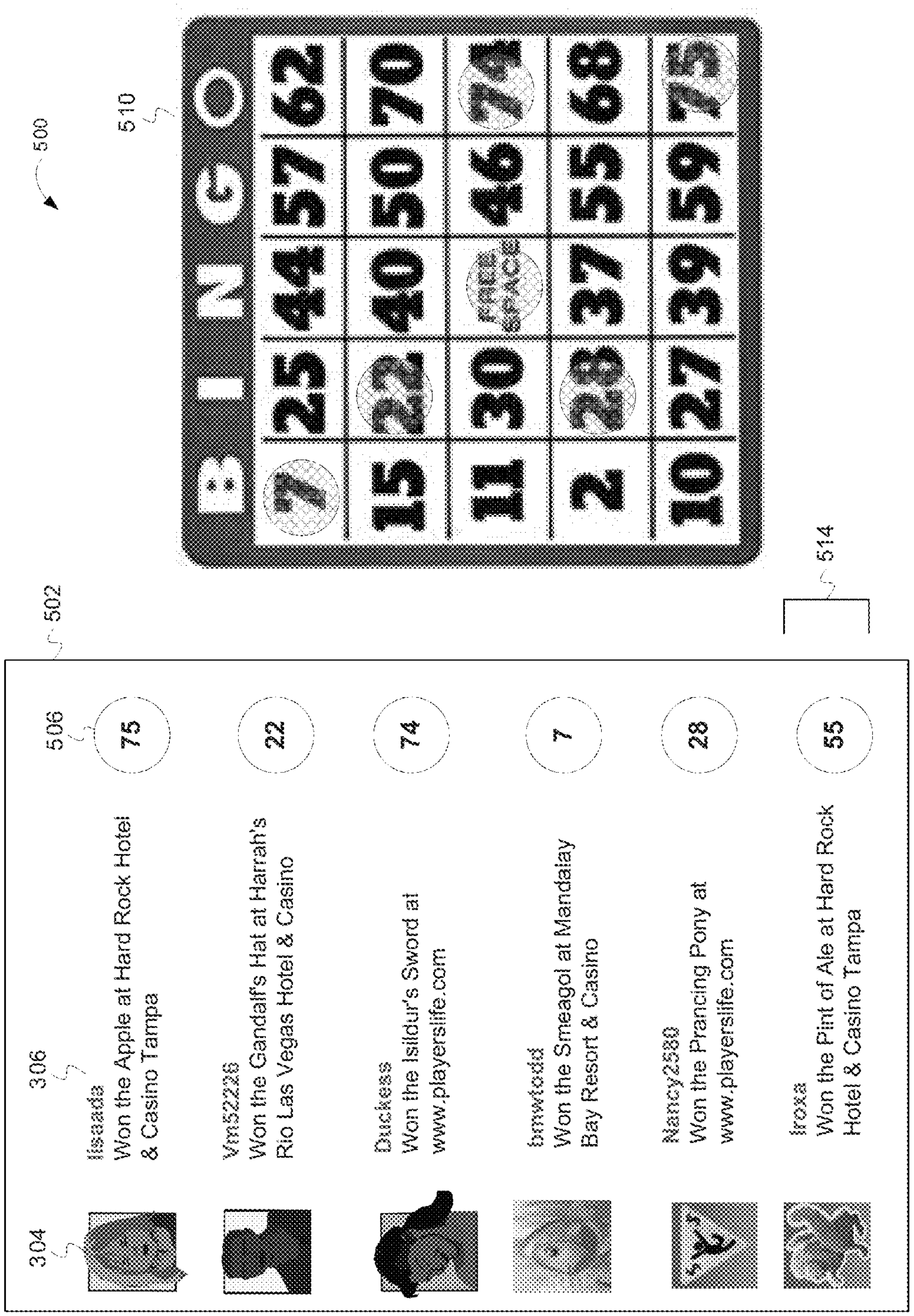
Figure 6:
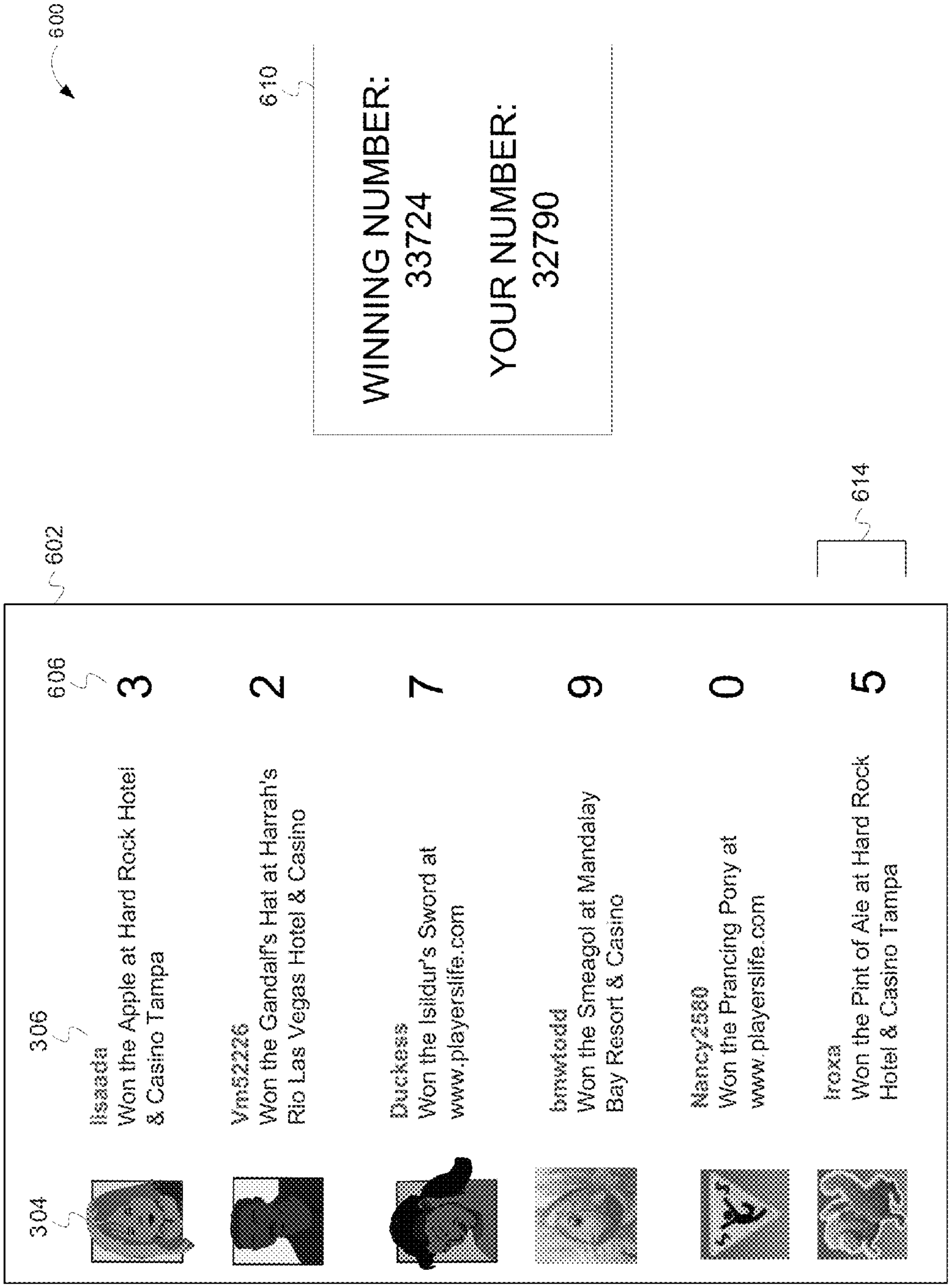
Figure 7:
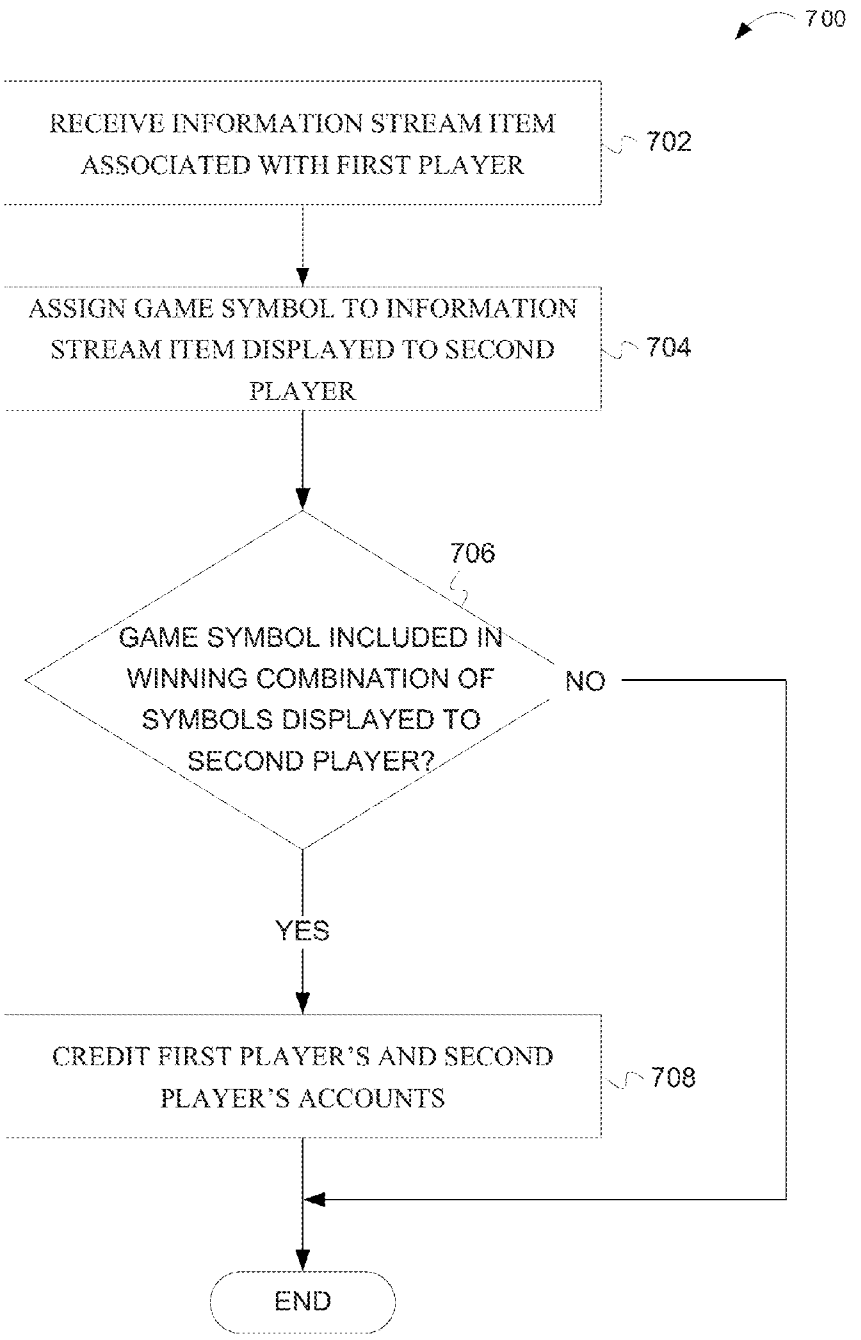
FIG. 7 is a flowchart illustrating a method for implementing a game according to embodiments.
Figure 8:
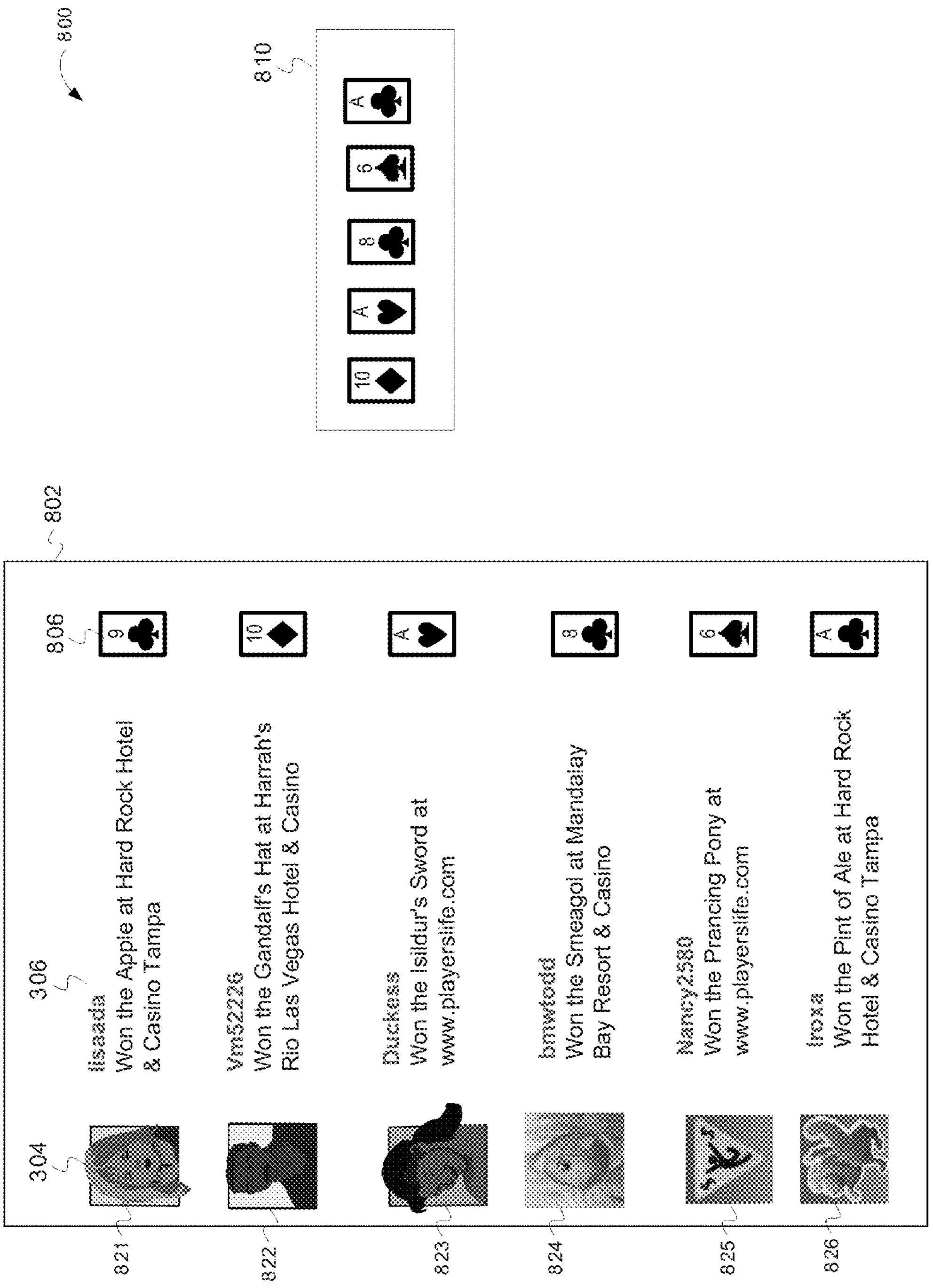
FIG. 8 is an example display according to further alternative embodiments.
Figure 9:
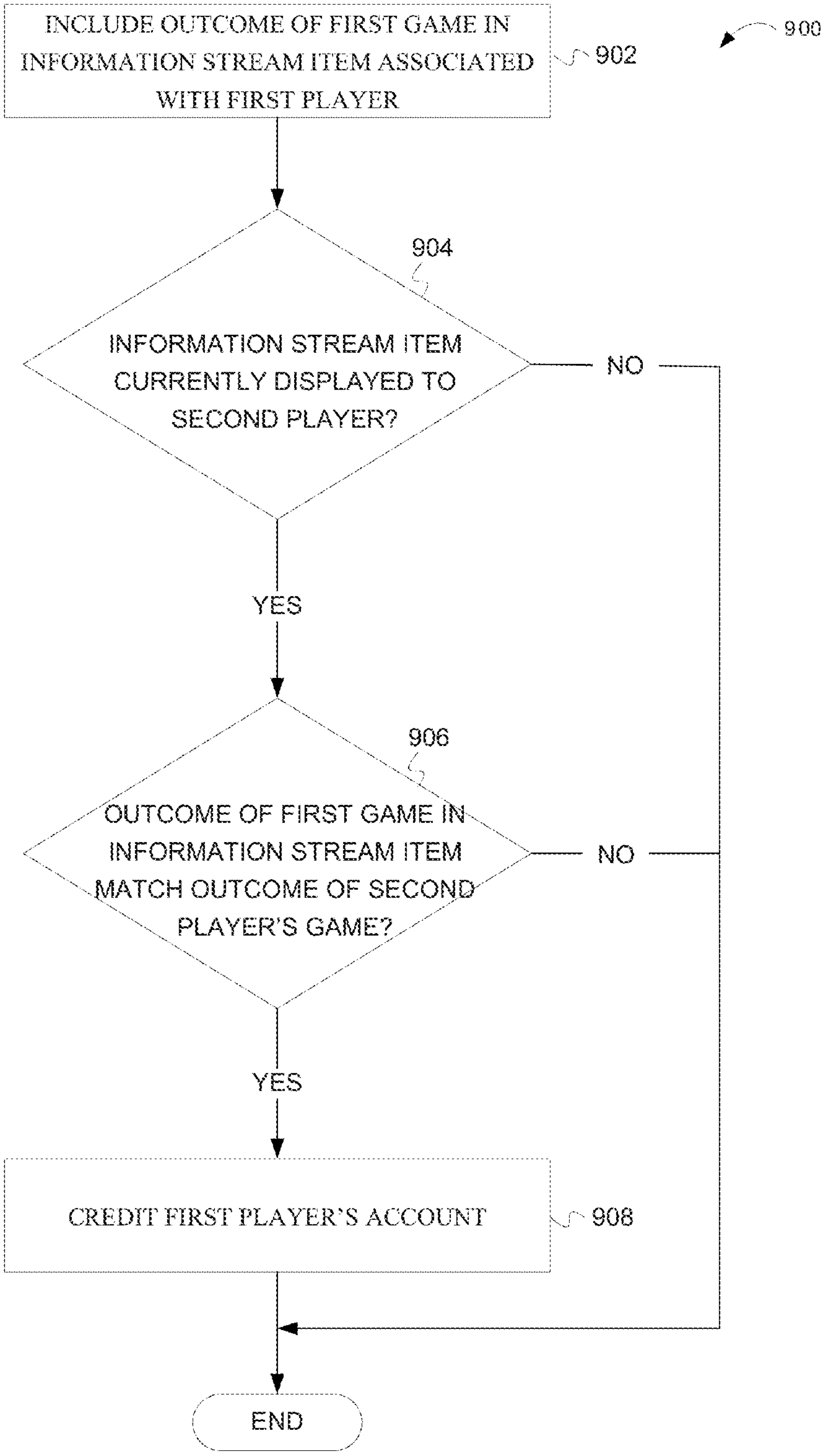
FIG. 9 is a flowchart illustrating a method for implementing a game according to alternative embodiments.
Figure 10:
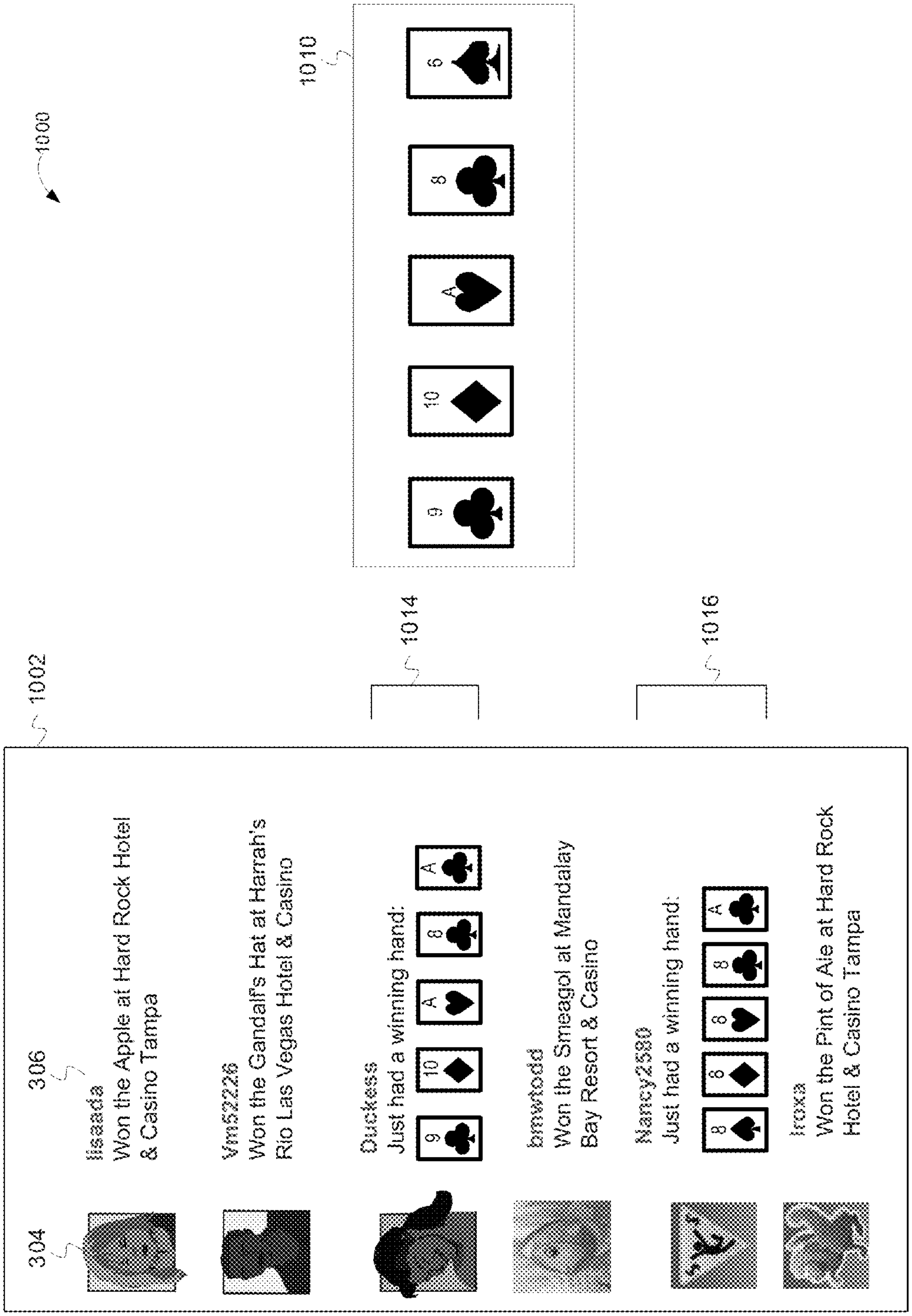
FIG. 10 is an example display according to further alternative embodiments.

The section will discuss FIGS. 2-10. The discussion of FIGS. 2-6 will describe operations for presenting games based on symbols assigned to information stream items and will also provide example screen images associated with particular games. FIGS. 7-8 describe an information stream based game where a player wins based on the appearance of an item generated by or on behalf of the player in a winning combination of another player and an example screen image associated with such a game. FIGS. 9-10 describe an information stream based game in which a player's winning outcome is part of an information stream and can be used for further winnings if the winning outcome matches a winning outcome of another player and an example screen image associated with such a game.

Figure 2:
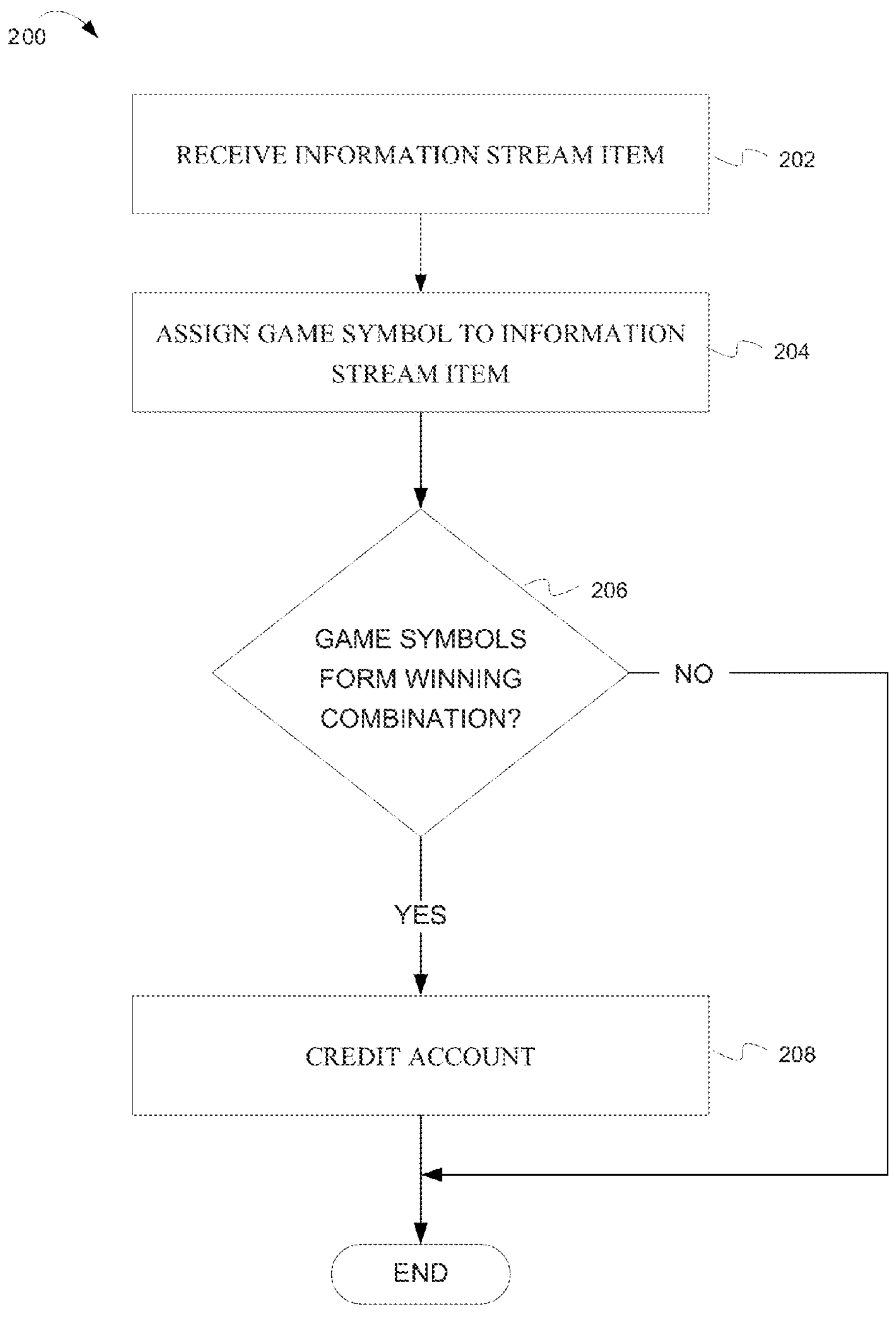
FIG. 2 is a flowchart illustrating a method for assigning game symbols to information stream items according to embodiments.

FIG. 2 is a flowchart illustrating a method 200 for presenting a game based on symbols assigned to information stream items. The method begins at block 202 by receiving an information stream item from an information stream server. As discussed above, various types of information streams may be utilized in an information stream game 120, including Facebook news feeds, WinStream feeds, twitter postings ("tweets"), RSS feeds, LinkedIn news feeds etc.

At block 204, the system assigns a symbol or token to an information item received at block 202. The symbol or token may be assigned according to the output of a random number generator. In some embodiments, the random number generator may be invoked every time a news item is received and symbols or tokens assigned on an item by item basis.

In alternative embodiments, the output of the random number generator may be used to determine an overall outcome of a game of chance and then symbols or tokens are generated to reflect the outcome. As information stream items are received, the information stream item is assigned the next unused symbol or token until all of the symbols or tokens for the game are used.

At block 206, the system determines if the game symbols assigned at block 204 form a winning combination of symbols or tokens. In some embodiments, the determination is made according to a paytable. If the symbols or tokens do not form a winning combination, then the method ends.

Otherwise, if the symbols or tokens do form a winning combination, then at block 208 the system credits an account with winnings associated with the winning combination. The amount to be credited may be determined according to a paytable. As noted above, the winnings may be in the form of cash, credits, points etc.

FIGS. 3-6 are example displays for various types of games of chance that may be implemented using the method above and provide further details of the various embodiments.

Figure 3:
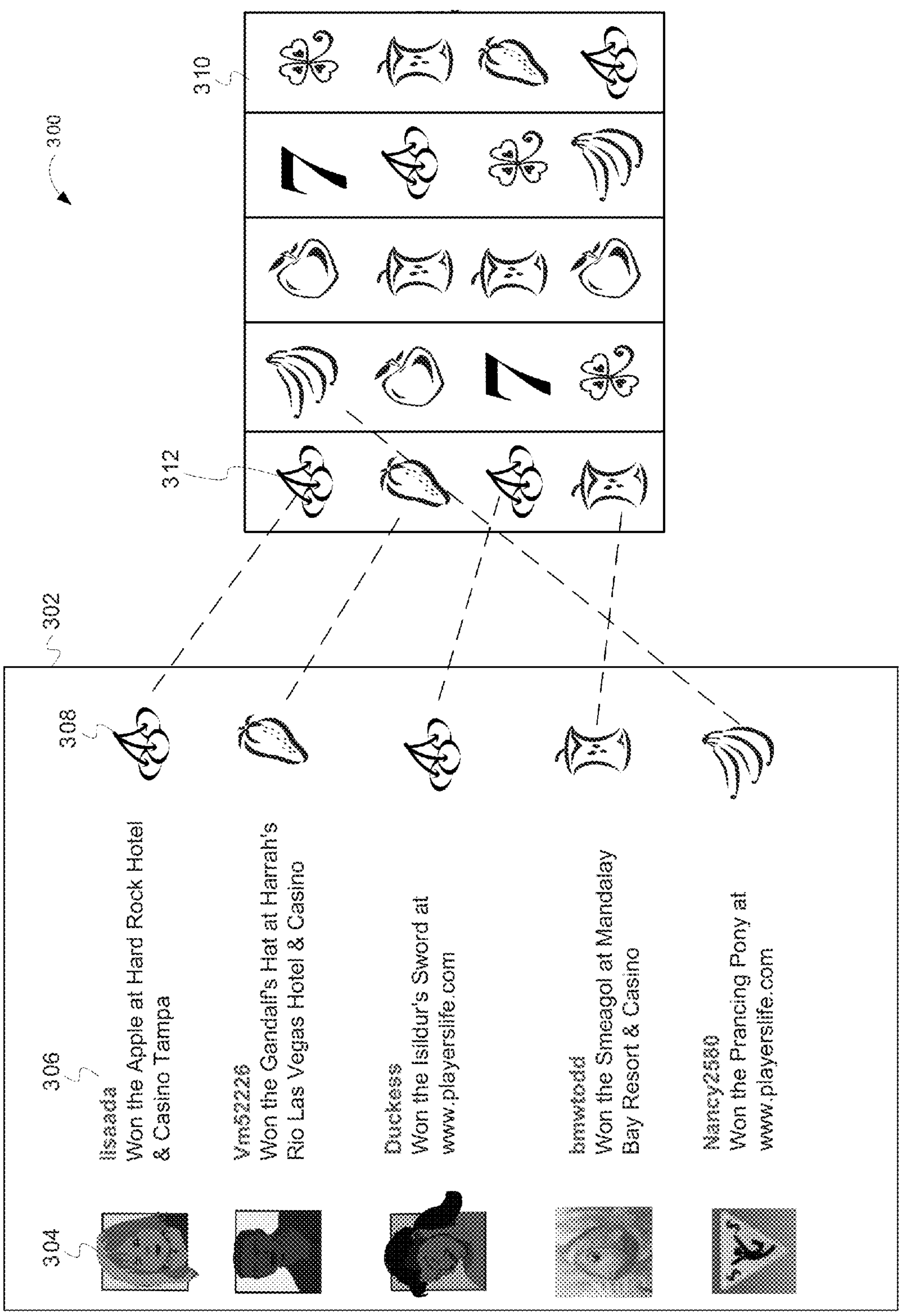
FIGS. 3-6 are example displays for games that may be implemented using game symbols assigned to information stream items according to embodiments.

FIG. 3 is an example display 300 for an information stream based game where the game is based on a slots game. In the example shown, an information stream window 302 provides a real time feed of news items. Each news item may be associated with an avatar 304, news content 306 and a symbol 308. Avatar 304 is a picture that represents the person or thing associated with news content 306. News content 306 is content that provides information regarding the person represented by avatar 304. The news content may be posted by the person. For example, in a Facebook, LinkedIn or Twitter based information stream, a user may enter content to be posted to friends, contacts, or followers of the user. Alternatively, content 306 may have been automatically generated. For example, in WinStream based embodiments, content is generated when a user experiences a win at a wagering game machine.

Symbol 308 is generated by the system. In the examples shown, reel symbols are generated and associated with each information stream item in window 302. As news items scroll by in window 302, the reel symbols associated with the items in window 302 are used to populate reels in game window 310. For example, symbol 308 from information stream window 302 has been used to populate position 312 of game window 310. The order that symbols from items in information stream window 302 may vary in different embodiments. For example, in some embodiments, symbols from information stream windows may populate reel positions in game display window 310 horizontally from left to right, with a new row starting when a row is completed. In alternative embodiments, the symbols from information stream windows may populate reel positions in game display window 310 vertically from top to bottom, with a new reel populated when a reel is completed. In further alternative embodiments, the reel positions may be populated in a random order. Upon completion of all reels, the payout associated with the outcome, if any, is awarded to the player and a new round of the information stream based game may begin.

Figure 4:
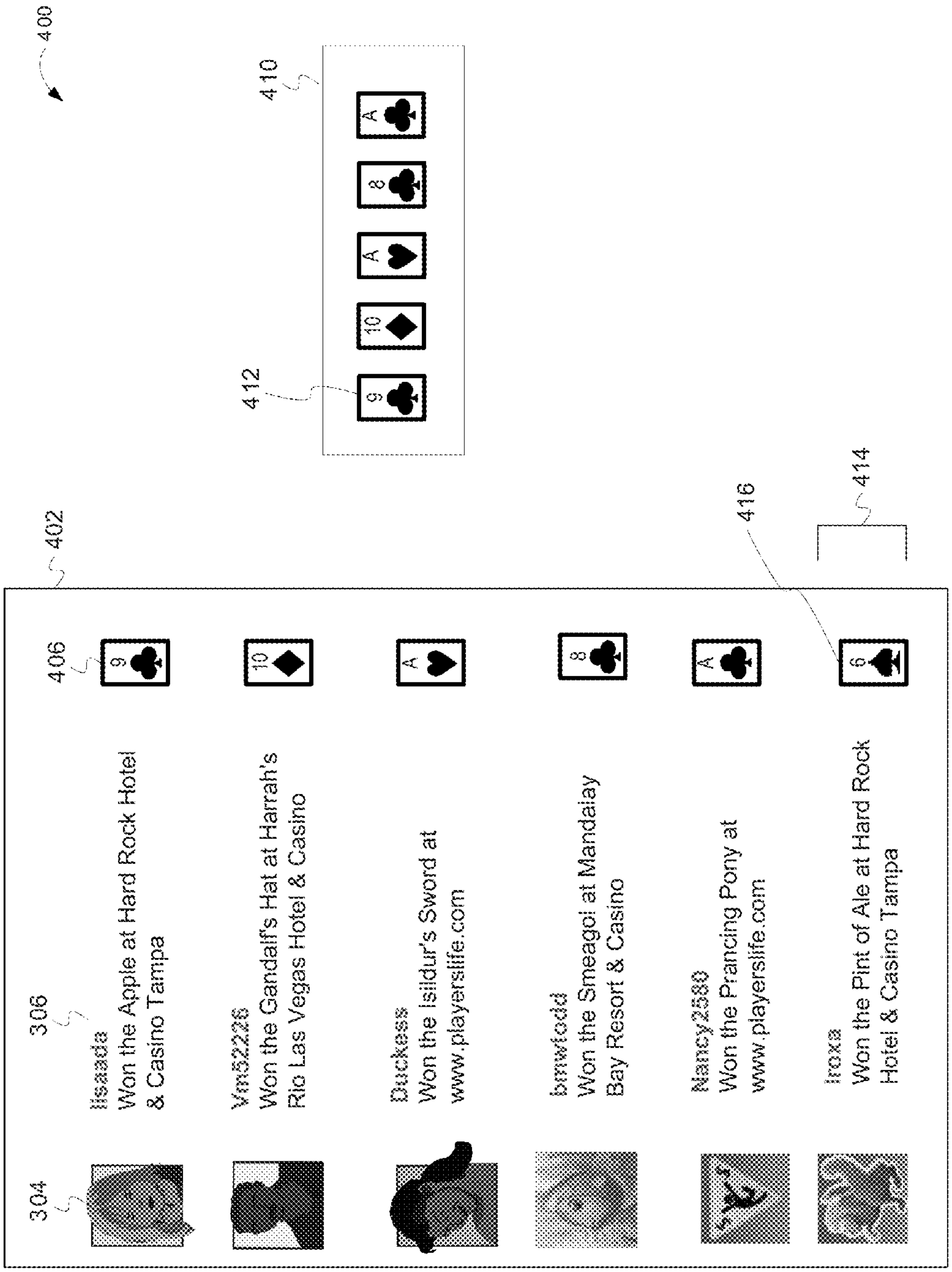

FIG. 4 is an example display 400 for an information stream based game where the game is based on a card game such as poker. As in FIG. 3 above, an information stream window 402 provides a real time feed of news items that can have avatars 304 and content 306. In the example shown in FIG. 4, symbols 406 are cards that are dealt to a player. Game display window 410 displays the current hand formed by the cards associated with the news items in information stream window 402. In the example shown, symbol 406 from the information stream window 402 has been used as the first card 412 in game display 410. Assuming a simple poker style card game, four other cards associated with the next four news items have been used to complete the hand. The player has achieved a pair of aces, and in some embodiments, a paytable is used to determine the payout associated with the hand. As news item 414 appears in the information stream window 402, a new hand may begin and card 416 may be used as the first card 412 of the new hand.

FIG. 5 is an example display 500 for an information stream based game where the game is based on a bingo game. As in FIGS. 3 and 4 above, an information stream window 502 provides a real time feed of news items that can have avatars 304 and content 306. In the example shown in FIG. 5, symbols 506 are bingo balls that represent positions on a bingo card display 510. In this example, information stream based game 120 may be a multiplayer game in which each player is provided a different bingo card. As information stream items are added to information stream window 502, bingo ball symbols are associated with the newly added items. In the example illustrated in FIG. 5, newly added information stream item 514 provides a symbol ("ball 55") that completes a winning pattern in bingo card display 510. Completion of the winning pattern may cause an award to be provided to the player, and a new round of the game to begin.

In alternative embodiments, a bingo based information streaming game may be a single player game in which a player must receive a winning pattern of symbols prior to the expiration of a timer or occurrence of another event. A new game starts upon completion of the time or occurrence of the completion event.

FIG. 6 is an example display 600 for an information stream based game where the game is a symbol matching game. As in FIGS. 3-5 above, an information stream window 602 provides a real time feed of news items that can have avatars 304 and content 306. In the example shown in FIG. 6, symbols 606 are digits of a number. At the start of a game, game window 610 displays the number that must be matched in order to win (e.g., "33724") and the number currently formed by the digits randomly assigned to the information stream items in information stream window 602 (e.g., "32790"). As new information item 614 appears in information stream window 602, the digit associated with the information stream item may be used to complete a currently incomplete number, start a new number, or replace a digit in a current number to form a new number. Similar to the bingo game described above, the game may be a multiplayer or single player game in various embodiments. In multiplayer game embodiments, play continues until a player matches the winning number. In single player game embodiments, play may continue until the expiration of a time or the occurrence of an event.

FIGS. 3-6 have illustrated various types of games that may be implemented using the method described in FIG. 2. Those of skill in the art having the benefit of the disclosure will appreciate that other types of games could be used and that such games are within the scope of the inventive subject matter.

FIG. 7 is a flowchart illustrating a method 700 for presenting a game based on symbols assigned to information stream items where a person associated with an information stream item can participate in the a game. Like method 200, method 700 begins at block 702 by receiving an information stream item from an information stream server. The information stream item is associated with a first player. For example, the first player may be a Facebook user, LinkedIn user or Twitter user who has posted information. Alternatively, the first player may be a player who has registered an account with WinStream and where an information stream about the first player has been automatically generated (e.g., the first player had a win either online or at a wagering game machine).

At block 704, the system assigns a symbol or token to the information item received at block 702. The symbol or token may be assigned according to the output of a random number generator. In some embodiments, the random number generator may be invoked every time a news item is received and symbols or tokens assigned on an item by item basis.

In alternative embodiments, the output of the random number generator may be used to determine an overall outcome of a game of chance and then symbols or tokens are generated to reflect the outcome. As information stream items are received, the information stream item is assigned the next unused symbol or token until all of the symbols or tokens for the game are used.

At block 706, the system determines if the game symbol assigned at block 204 is part a winning combination of symbols or tokens that have been assigned to information stream items presented to a second player. In some embodiments, the determination is made according to a paytable. If the symbols or tokens do not form a winning combination, then the method ends.

Otherwise, if the symbols or tokens presented to the second player do form a winning combination, then at block 708 the system credits an account associated with the second player with winnings associated with the winning combination. The amount to be credited may be determined according to a paytable. In addition, the system credits an account associated with the first player as a result of the symbol or token associated with their information stream item being part of the winning combination. The amount to be credited to the first player may be determined independently from the amount determined for the second player. Alternatively, the amount may be determined as a percentage of the second player's winning amount. As noted above, the winnings may be in the form of cash, credits, points etc.

FIG. 8 is an example display 800 for an information stream based game that will be used to illustrate the operation of method 700. A poker game will be used in the example, however those of skill in the art having the benefit of the disclosure will appreciate that other games may be used and are within the scope of the inventive subject matter. Example display 800 includes information streaming area 802 and a game display area 810 where game results are displayed. In the example illustrated in FIG. 8, card symbols 806 have been assigned to the information stream items associated with various first players. The assigned symbols for the most recent five information stream items have resulted in a winning hand (e.g., a pair of aces) being displayed in game display area 810 for a second player. As a result, the second player is awarded an amount determined according to a poker pay table. In addition, some or all of players 822-826 may be awarded an amount for having been associated with the winning game symbols. Player 821, while in the information stream area, would not receive winnings because the symbol assigned to player 821's information stream item was not part of the winning hand displayed in game display area 810. In some embodiments, all of the players having symbols contributing to a winning combination may be awarded winnings In alternative embodiments, only those players whose symbols caused the win may be awarded winnings For example, players 823 and 826 were associated with the aces that were cause of the winning hand in game display 810. Thus in some embodiments, players 823 and 826 would be awarded winnings, while players 822, 824 and 825 would not.

FIG. 9 is a flowchart illustrating a method 900 for presenting a game based where previous game results displayed in information stream items are used to determine further game results. The method begins at block 902 where a game outcome of a first player is provided as an information stream item displayed to a second player. As an example, a set of symbols for an outcome of a slot machine may be included in an information stream item.

At block 904, the system determines if the outcome in the information stream for the first player is currently being displayed to a second player in an information stream area of a game being played by the second player. If the information stream item is not currently being displayed, the method ends.

Otherwise, if the information stream item for the first player is currently being displayed to a second player, then at block 906 the system determines if the outcome for the first player provided in the information stream area matches an outcome of a wagering game being played by the second player. If there is no match, then the method ends.

Otherwise, if the outcome displayed in the information stream item matches an outcome of the second player, then at block 908, the first player is awarded an amount. The amount awarded may be a set amount, or it may be an amount determined in accordance with a pay table.

FIG. 10 is an example screen image 1000 for a card based game that will be used to illustrate the operation of method 900. Screen image 1000 includes information stream area 1002 and primary game display area 1010. In the example provided in FIG. 10, a poker based game is presented in primary game display area 1010. Information stream area 1002 includes information stream items for various players and may be displayed during game play that is presented in primary game display area 1010. As new information stream items are received, they may be added to information stream area 1002, with older information stream items scrolling out of the information stream area 1002. Information stream items 1014 and 1016 include outcomes of previous games by players having user identifications of "Duckess" and "Nancy2580" respectively. The outcomes in information stream items 1014 and 1016 are compared to outcomes in primary game display area 1010. In some embodiments, the outcomes may be compared to the outcome presented in primary game display area 1010 when the information stream item initially appears in information stream area 1002. In alternative embodiments, the outcomes in an information stream item may be compared to all outcomes presented in a primary game display area 1010 while the information stream item remains in an information stream area 1002.

Many variations of the above are possible in various embodiments. For example, in some embodiments, a player may pay to have outcomes included in information stream items. The payment may be in the form of a cash payment, or in the form of points (e.g., loyalty points, points awarded for participation in activities, marketing dollars etc.). Further, the amount of the payment may vary. For example, the amount may vary based on the number of times or the length of time that an information stream having an outcome associated with the player is to appear in information streaming areas. Further, the amount may vary depending on the number of casinos or geographic area that the information stream item is to appear. Further, the amount may vary depending on the outcome that is to be matched. For example, the amount paid to have outcomes displayed in information stream areas may vary depending on the odds that the outcome will match a second player's outcome. As an example, in the case of the poker based game illustrated in FIG. 10, player 1016 may pay less to have an outcome provided in an information stream area than player 1014 on the basis that it is more likely to match the pair in item 1014 than the four of a kind in outcome 1016. Alternatively, the winning amount paid may vary depending on the odds of a match.

Additionally, the systems and methods described above may be provided as part of a sweepstakes or other promotion. For example, a company promotion may provide a condition that must be satisfied in order to enter the promotion. For instance, a promotion condition may be that in order to enter the promotion, a player must provide an information steam item about a company product (e.g., "tweet" about a product), or provide an information stream item from a particular location (e.g., "tweet" from an amusement park). Upon satisfying the entry condition, the player is entered into the sweepstakes or promotion and is allowed to participate in the information streaming game associated with the sweepstakes or promotion. In a sweepstakes style embodiment, the information streaming game may generate a winning symbol or symbols that are entered into an information stream item for a player. Alternatively, all players may be provided randomly generated symbols. If a randomly generated symbol or symbols matches a winning symbol or combination of symbols, the player wins the sweepstakes or promotion. In some embodiments, the player may be provided contact information such as a URL or phone number. In order to cli the promotional prize, the player utilizes the contact information. Thus in such embodiments, the player must be present and observe the winning symbol or combination of symbols as they pass through an information stream.

The discussion in the sections above has described system components and methods for presenting a game of chance based on information stream items. The next section will describe machine and system architectures and operating environments that support the operations described above.

Wagering Game Machine Architectures

Figure 11:
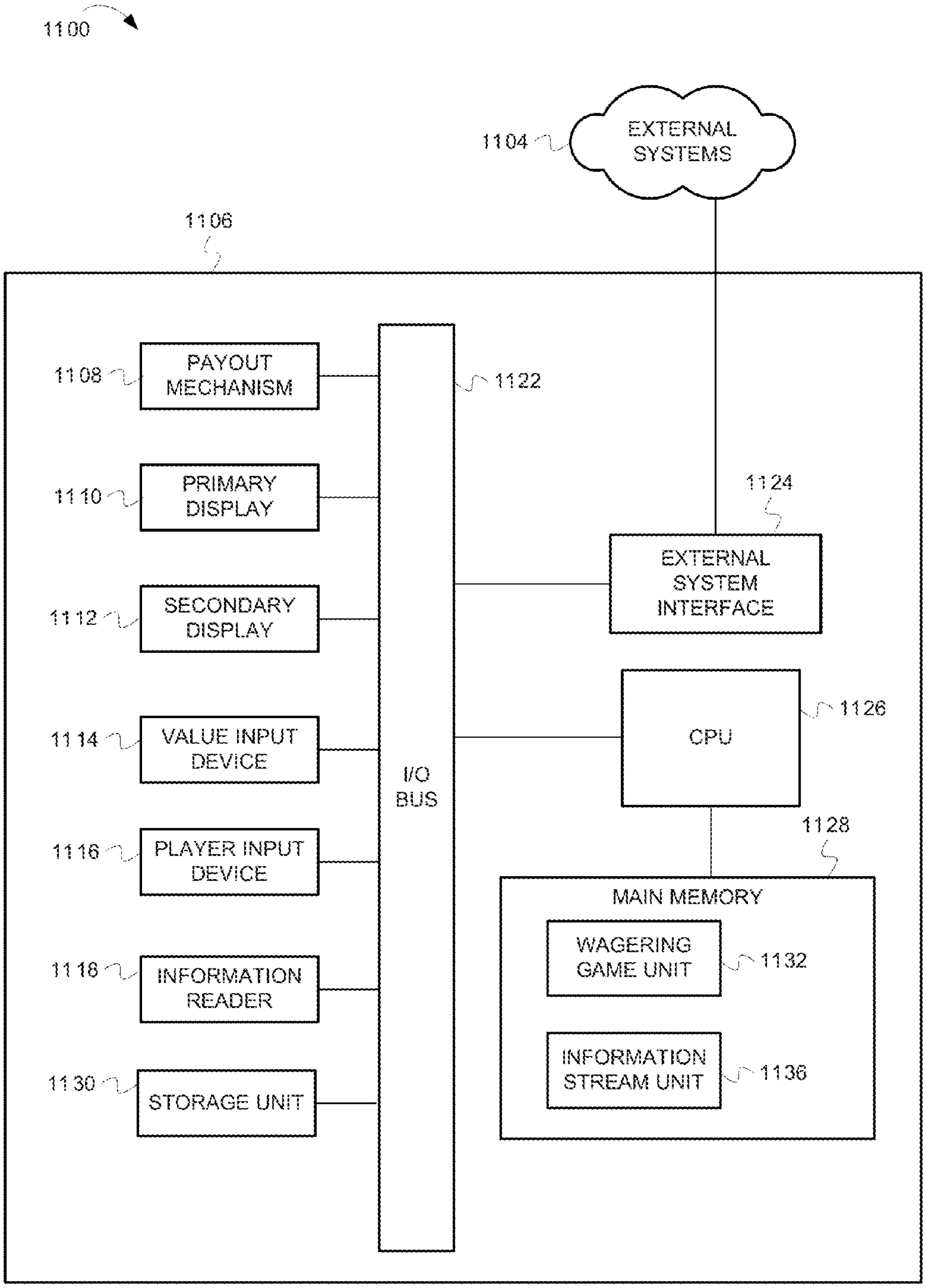
FIG. 11 is a block diagram illustrating a wagering game machine architecture, according to example embodiments of the invention.

FIG. 11 is a block diagram illustrating a wagering game machine architecture, according to example embodiments of the invention. As shown in FIG. 11, the wagering game machine architecture 1100 includes a wagering game machine 1106, which includes a central processing unit (CPU) 1126 connected to main memory 1128. The CPU 1126 can include any suitable processor, such as an Intel® Pentium processor, Intel® Core 2 Duo processor, AMD Opteron™ processor, or UltraSPARC processor. The main memory 1128 includes a wagering game unit 1132. In one embodiment, the wagering game unit 1132 can present wagering games, such as video poker, video black jack, video slots, video lottery, etc., in whole or part.

The CPU 1126 is also connected to an input/output (I/O) bus 1122, which can include any suitable bus technologies, such as an AGTL+ frontside bus and a PCI backside bus. The I/O bus 1122 is connected to a payout mechanism 1108, primary display 1110, secondary display 1112, value input device 1114, player input device 1116, information reader 1118, and storage unit 1130. The player input device 1116 can include the value input device 1114 to the extent the player input device 1116 is used to place wagers. The I/O bus 1122 is also connected to an external system interface 1124, which is connected to external systems 1104 (e.g., wagering game networks).

In one embodiment, the wagering game machine 1106 can include additional peripheral devices and/or more than one of each component shown in FIG. 11. For example, in one embodiment, the wagering game machine 1106 can include multiple external system interfaces 1124 and/or multiple CPUs 1126. In one embodiment, any of the components can be integrated or subdivided.

Any component of the architecture 1100 can include hardware, firmware, and/or machine-readable media including instructions for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

While FIG. 11 describes an example wagering game machine architecture, this section continues with a discussion wagering game networks.

Wagering Game Networks

Figure 12:
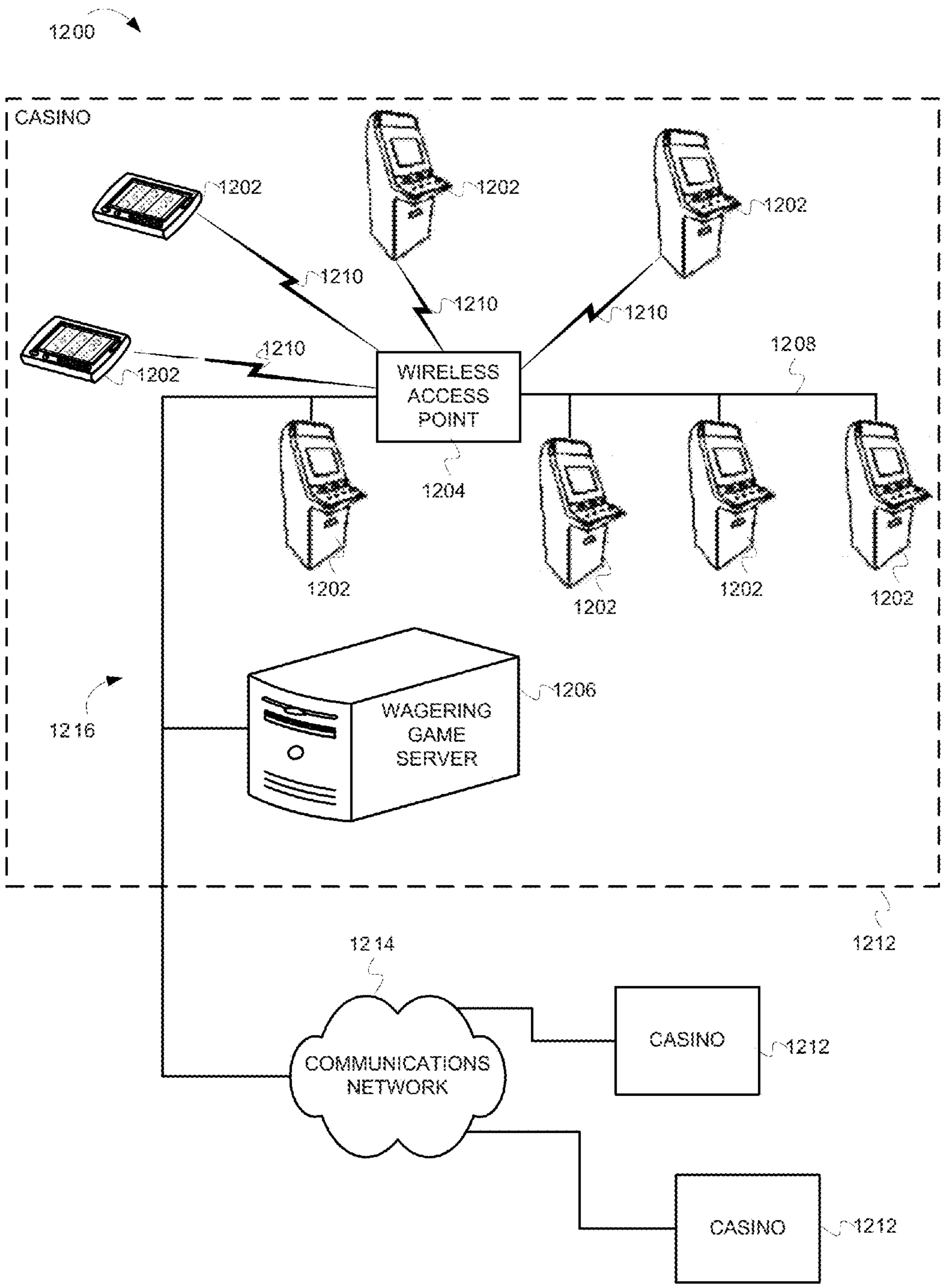
FIG. 12 is a block diagram illustrating a wagering game network 1200, according to example embodiments of the invention.

FIG. 12 is a block diagram illustrating a wagering game network 1200, according to example embodiments of the invention. As shown in FIG. 12, the wagering game network 1200 includes a plurality of casinos 1212 connected to a communications network 1214.

Each casino 1212 includes a local area network 1216, which includes an access point 1204, a wagering game server 1206, and wagering game machines 1202. The access point 12304 provides wireless communication links 1210 and wired communication links 1208. The wired and wireless communication links can employ any suitable connection technology, such as Bluetooth, 802.11, Ethernet, public switched telephone networks, SONET, etc. In some embodiments, the wagering game server 1206 can serve wagering games and distribute content to devices located in other casinos 1212 or at other locations on the communications network 1214.

The wagering game machines 1202 described herein can take any suitable form, such as floor standing models, handheld mobile units, bartop models, workstation-type console models, etc. Further, the wagering game machines 1202 can be primarily dedicated for use in conducting wagering games, or can include non-dedicated devices, such as mobile phones, personal digital assistants, personal computers, etc. In one embodiment, the wagering game network 1200 can include other network devices, such as accounting servers, wide area progressive servers, player tracking servers, and/or other devices suitable for use in connection with embodiments of the invention.

In some embodiments, wagering game machines 1202 and wagering game servers 1206 work together such that a wagering game machine 1202 can be operated as a thin, thick, or intermediate client. For example, one or more elements of game play may be controlled by the wagering game machine 1202 (client) or the wagering game server 1206 (server). Game play elements can include executable game code, lookup tables, configuration files, game outcome, audio or visual representations of the game, game assets or the like. In a thin-client example, the wagering game server 1206 can perform functions such as determining game outcome or managing assets, while the wagering game machine 1202 can present a graphical representation of such outcome or asset modification to the user (e.g., player). In a thick-client example, the wagering game machines 1202 can determine game outcomes and communicate the outcomes to the wagering game server 1206 for recording or managing a player's account.

In some embodiments, either the wagering game machines 1202 (client) or the wagering game server 1206 can provide functionality that is not directly related to game play. For example, account transactions and account rules may be managed centrally (e.g., by the wagering game server 1206) or locally (e.g., by the wagering game machine 1202). Other functionality not directly related to game play may include power management, presentation of advertising, software or firmware updates, system quality or security checks, etc.

Any of the wagering game network components (e.g., the wagering game machines 1202) can include hardware and machine-readable media including instructions for performing the operations described herein.

Example Wagering Game Machines

Figure 13:
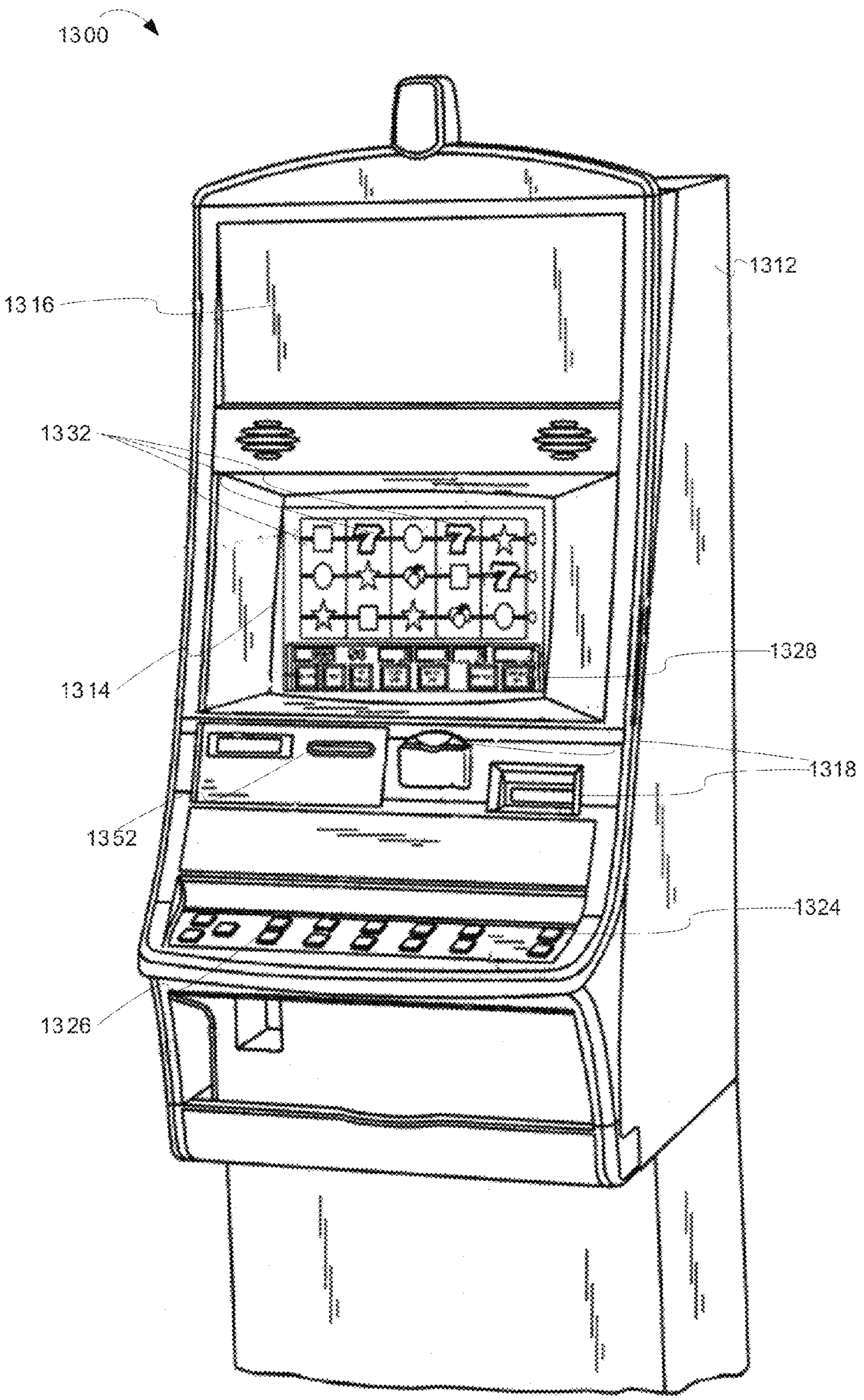
FIG. 13 is a perspective view of a wagering game machine, according to example embodiments of the invention.

FIG. 13 is a perspective view of a wagering game machine, according to example embodiments of the invention. Referring to FIG. 13, a wagering game machine 1300 is used in gaming establishments, such as casinos. According to embodiments, the wagering game machine 1300 can be any type of wagering game machine and can have varying structures and methods of operation. For example, the wagering game machine 1300 can be an electromechanical wagering game machine configured to play mechanical slots, or it can be an electronic wagering game machine configured to play video casino games, such as blackjack, slots, keno, poker, blackjack, roulette, etc.

The wagering game machine 1300 comprises a housing 1312 and includes input devices, including value input devices 1318 and a player input device 1324. For output, the wagering game machine 1300 includes a primary display 1314 for displaying information about a basic wagering game. The primary display 1314 can also display information about a bonus wagering game and a progressive wagering game. The wagering game machine 1300 also includes a secondary display 1316 for displaying wagering game events, wagering game outcomes, and/or signage information. While some components of the wagering game machine 1300 are described herein, numerous other elements can exist and can be used in any number or combination to create varying forms of the wagering game machine 1300.

The value input devices 1318 can take any suitable form and can be located on the front of the housing 1312. The value input devices 1318 can receive currency and/or credits inserted by a player. The value input devices 1318 can include coin acceptors for receiving coin currency and bill acceptors for receiving paper currency. Furthermore, the value input devices 1318 can include ticket readers or barcode scanners for reading information stored on vouchers, cards, or other tangible portable storage devices. The vouchers or cards can authorize access to central accounts, which can transfer money to the wagering game machine 1300.

The player input device 1324 comprises a plurality of push buttons on a button panel 1326 for operating the wagering game machine 1300. In addition, or alternatively, the player input device 1324 can comprise a touch screen 1328 mounted over the primary display 1314 and/or secondary display 1316.

The various components of the wagering game machine 1300 can be connected directly to, or contained within, the housing 1312. Alternatively, some of the wagering game machine's components can be located outside of the housing 1312, while being communicatively coupled with the wagering game machine 1300 using any suitable wired or wireless communication technology.

The operation of the basic wagering game can be displayed to the player on the primary display 1314. The primary display 1314 can also display a bonus game associated with the basic wagering game. The primary display 1314 can include a cathode ray tube (CRT), a high resolution liquid crystal display (LCD), a plasma display, light emitting diodes (LEDs), or any other type of display suitable for use in the wagering game machine 1300. Alternatively, the primary display 1314 can include a number of mechanical reels to display the outcome. In FIG. 13, the wagering game machine 1300 is an "upright" version in which the primary display 1314 is oriented vertically relative to the player. Alternatively, the wagering game machine can be a "slant-top" version in which the primary display 1314 is slanted at about a thirty-degree angle toward the player of the wagering game machine 1300. In yet another embodiment, the wagering game machine 1300 can exhibit any suitable form factor, such as a free standing model, bartop model, mobile handheld model, or workstation console model.

A player begins playing a basic wagering game by making a wager via the value input device 1318. The player can initiate play by using the player input device's buttons or touch screen 1328. The basic game can include arranging a plurality of symbols along a payline 1332, which indicates one or more outcomes of the basic game. Such outcomes can be randomly selected in response to player input. At least one of the outcomes, which can include any variation or combination of symbols, can trigger a bonus game.

In some embodiments, the wagering game machine 1300 can also include an information reader 1352, which can include a card reader, ticket reader, bar code scanner, RFID transceiver, or computer readable storage medium interface. In some embodiments, the information reader 1352 can be used to award complimentary services, restore game assets, track player habits, etc.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A method of operating a gaming system including a gaming machine, the gaming machine primarily dedicated to playing at least one casino wagering game, the gaming machine including an electronic display device, and one or more electronic input devices, the method comprising:

detecting, via at least one of the one or more electronic input devices, a physical item associated with a monetary value that establishes a credit balance;

initiating a first casino wagering game in response to an input indicative of a wager covered by the credit balance;

receiving, via a network interface coupled to the gaming machine, an information stream item for display, on the electronic display device, in a series of information stream items, wherein the information stream items comprise postings of information associated with users other than a player of the first casino wagering game;

randomly assigning, based at least in part on an output of a random element generator, a game symbol for a second casino wagering game to the information stream item;

displaying the information stream items and game symbols assigned to the information stream items on the electronic display device;

awarding an award in response to determining, by one or more processors, that game symbols assigned to the series of information stream items form a winning combination of game symbols for the second casino wagering game; and receiving, via at least one of the one or more electronic input devices, a cashout input that initiates a payout from the credit balance.

2. The method of claim 1, wherein the game symbol comprises a playing card and wherein determining that the game symbols assigned to the series of information stream items form the winning combination includes determining the winning combination according to winning outcomes for a card based game.

3. The method of claim 1, wherein the game symbol comprises a reel symbol and wherein determining that the game symbols assigned to the series of information stream items form the winning combination includes determining the winning combination according to winning outcomes for a slots based game.

4. The method of claim 1, wherein the game symbol comprises a bingo number and wherein determining that the game symbols assigned to the series of information stream items form the winning combination includes determining the winning combination according to winning outcomes for a bingo based game.

5. The method of claim 1, wherein receiving an information stream item includes receiving an information stream item associated with a Facebook user, a LinkedIn user, a Twitter feed, or an RSS feed.

6. The method of claim 1, and further comprising:

receiving an indication that a first player desires to be included in a game; and in response to determining that a game symbol assigned to an information stream item associated with the first player is part of the winning combination of game symbols in the information stream, crediting an account associated with the first player.

7. The method of claim 1, further comprising:

displaying an outcome of a third casino wagering game associated with a second player in the information stream, during game play of the first casino wagering game; and in response to determining, by the one or more processors, that the outcome of the third casino wagering game matches an outcome of the first casino wagering game while the outcome of the third casino wagering game remains displayed in the information stream, crediting a second account associated with the second player.

8. The method of claim 7, and further comprising receiving a payment in exchange for providing the outcome of the second casino wagering game in the information stream.

9. The method of claim 8, and further comprising determining a number of times the outcome of the second casino wagering game is provided in one or more information streams in accordance with the payment.

10. The method of claim 8, and further comprising determining a length of time that the outcome of the second casino wagering game is provided in one or more information streams in accordance with the payment.

11. The method of claim 8, and further comprising determining an amount of the payment in accordance with a probability that the outcome of the third casino wagering game will match the outcome of the first casino wagering game.

12. A non-transitory machine-readable medium having stored thereon machine executable instructions for execution by one or more processors of a gaming system including a gaming machine, the gaming machine primarily dedicated to playing at least one casino wagering game, the gaming machine including an electronic display device, and one or more electronic input devices, the machine executable instructions to cause the one or more processors to perform operations comprising:

detecting, via at least one of the one or more electronic input devices, a physical item associated with a monetary value that establishes a credit balance;

initiating a first casino wagering game in response to an input indicative of a wager covered by the credit balance;

receiving, via a network interface, an information stream item for display, on the electronic display device, in a series of information stream items, wherein the information stream items comprise postings of information associated with users other than a player of the first casino wagering game;

randomly assigning a game symbol for a second casino wagering game to the information stream item;

displaying the information stream items and game symbols assigned to the information stream items on the electronic display device;

awarding an award in response to determining, by the one or more processors, that game symbols assigned to the series of information stream items form a winning combination of game symbols for the second casino wagering game; and receiving, via at least one of the one or more electronic input devices, a cashout input that initiates a payout from the credit balance.

13. The non-transitory machine-readable medium of claim 12, wherein the game symbol comprises a playing card and wherein determining that the game symbols assigned to the series of information stream items form the winning combination includes determining the winning combination according to winning outcomes for a card based game.

14. The non-transitory machine-readable medium of claim 12, wherein the game symbol comprises a reel symbol and wherein determining that the game symbols assigned to the series of information stream items form the winning combination includes determining the winning combination according to winning outcomes for a slots based game.

15. The non-transitory machine-readable medium of claim 12, wherein the game symbol comprises a bingo number and wherein determining that the game symbols assigned to the series of information stream items form the winning combination includes determining the winning combination according to winning outcomes for a bingo based game.

16. The non-transitory machine-readable medium of claim 12, wherein receiving an information stream item includes receiving an information stream item associated with a Facebook user, a LinkedIn user, a Twitter feed, or an RSS feed.

17. The non-transitory machine-readable medium of claim 12, wherein the operations further include:

receiving an indication that a first player desires to be included in a game;

and in response to determining that a game symbol assigned to an information stream item associated with the first player is part of the winning combination of game symbols in the information stream, crediting an account associated with the first player.

18. The non-transitory machine-readable medium of claim 12, wherein the operations further comprise:

displaying an outcome of a third casino wagering game associated with a second player in the information stream, during game play of the first casino wagering game; and in response to determining, by the one or more processors, that the outcome of the third casino wagering game matches an outcome of the first casino wagering game while the outcome of the third casino wagering game remains displayed in the information stream, crediting second account associated with the second player.

19. The non-transitory machine-readable medium of claim 18, wherein the operations further comprise receiving a payment in exchange for providing the outcome of the second casino wagering game in the information stream.

20. The non-transitory machine-readable medium of claim 19, wherein the operations further comprise determining a number of times the outcome of the second casino wagering game is provided in one or more information streams in accordance with the payment.

21. The non-transitory machine-readable medium of claim 19, wherein the operations further comprise determining a length of time that the outcome of the second casino wagering game is provided in one or more information streams in accordance with the payment.

22. The machine-readable medium of claim 19, wherein the operations further comprise determining an amount of the payment in accordance with a probability that the outcome of the third casino wagering game will match the outcome of the first casino wagering game.

23. A gaming system comprising:

a game server configured to receive a plurality of information stream items from one or more information stream servers, wherein the information stream items comprise postings of information associated with users other than a player of a first casino wagering game;

a symbol assignment module configured to randomly assign a game symbol to an information stream item in the plurality of information stream items; and a gaming machine primarily dedicated to playing at least one casino wagering game the gaming machine including a gaming housing, an electronic display device, and one or more electronic input devices, the electronic display device and the one or more electronic input devices being coupled to the gaming housing, the one or more electronic input devices configured to detect a physical item associated with a monetary value that establishes a credit balance and to receive a cashout input that initiates a payout from the credit balance, the credit balance changing based on play of the first casino wagering game;

wherein the gaming machine is configured to present a second casino wagering game configured to:

determine whether game symbols assigned to the plurality of information stream items form a winning combination of game symbols, in response to determining the formation of the winning combination, crediting an account.

24. The gaming system of claim 23, wherein the game symbol comprises a reel symbol and wherein determining that the game symbols assigned to the plurality of information stream items form the winning combination includes determining the winning combination according to winning outcomes for a slots based game.

25. The gaming system of claim 23, wherein the one or more information stream servers comprises at least one of a Facebook server, a LinkedIn server, a Twitter server, or an RSS server.

* * * * *